Sept. 10, 1929.  H. D. KELLEY  1,727,345
METHOD OF WELDING
Filed Dec. 13, 1927

Inventor
Henry D. Kelley
By
Attorney

Patented Sept. 10, 1929.

1,727,345

UNITED STATES PATENT OFFICE.

HENRY DUNGAN KELLEY, OF PITTSBURGH, PENNSYLVANIA.

METHOD OF WELDING.

Application filed December 13, 1927. Serial No. 239,645.

The invention relates to welding by means of superheated molten metal poured into a mold in which the portions or parts to be welded are enclosed, the weld being formed by the cast metal which is interposed between the adjacent faces of the parts and fused with the latter. A special application of the invention is in the welding of broken parts, such as crank shafts, machine frames, and other mechanical elements in which the original dimensions of the fractured element must be preserved, and it is the primary object of the invention to insure an effective welding of the parts by casting superheated molten metal about the same without increasing the length or other dimension of the repaired element, this result being obtained by cutting away one or both faces of the parts to be welded, at the zone of fracture, to form a gap, and interposing in said gap one or more spacers, which may be either a separate metal block or an integral extension on the face of one of the parts to be welded, which defines the gap and maintains the same at a fixed predetermined width.

The practice of the invention is illustrated in the accompanying drawing, in which:—

Figure 1:
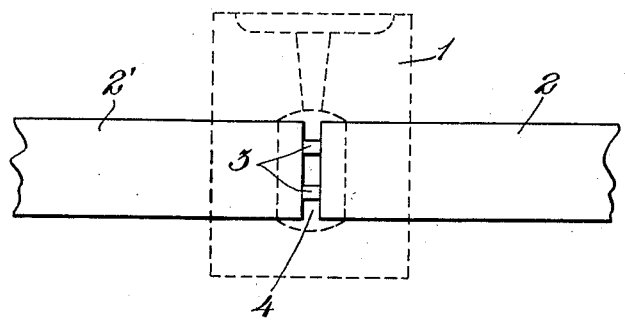
Fig. 1 is a diagrammatic side elevation of the means for practicing the invention with separate interposed spacers.

In the process of welding by means of superheated molten metal, such as alumino-thermic steel, the pieces to be welded are either separated slightly, so as to leave a gap between the ends, or such gap is provided by cutting away the ends of one or both of the sections to be joined. In welding fractured or broken machine elements or parts, the latter practice of cutting away the metal at one or both faces of the fracture to provide the necessary gap is followed, because otherwise the length of the finished or repaired part would be greater than the original length of said part, which would frequently render the latter unavailable for further use.

The ends or sections of the parts to be welded are enclosed in a suitable mold with a space about and between said parts to receive the superheated molten metal, which effects the weld, the space between the adjacent faces of the parts being the gap which is necessary in order to permit the superheated molten metal to come in contact and fuse with the faces of the adjacent parts. After the mold and the parts to be welded are thus assembled, the parts are preheated within the mold, and, when the mold has been thoroughly dried and the parts have attained at least a red heat, the superheated molten metal, such as alumino-thermic steel, is tapped into the mold, thereby locally recasting the parts and forming a homogeneous weld between the same. In such cases, it is of the utmost importance that the over-all dimensions, particularly the length of the finished or repaired piece, be no greater and no less than the original, and, in the alumino-thermic welding practice, as heretofore carried out, the operator has usually increased the gap between the parts to be repaired by approximately one quarter of an inch, in order to compensate for the contraction of the weld when cooling. This increase of the gap is more or less arbitrary and is not predicated upon any definite or fixed rule, because the apparent contraction of the weld is due almost entirely to the closing up of the gap by the elongation of the pieces during the preheating operation. For example, if two pieces, when cold, were separated by one-half of an inch, when in the mold, the preheating, which as hereinbefore indicated is carried out until the pieces attain substantially red heat, will expand the parts so that the gap between the ends of the pieces instead of being one-half of an inch will be reduced to one-quarter of an inch, which would be the condition when the superheated molten metal was poured into the mold to effect the weld. The contraction of the weld itself, that is to say, the actual contraction of the molten metal in the weld, is relatively slight, probably not exceeding one-sixty-fourth of an inch.

The present invention is designed to eliminate the more or less haphazard fixing of the gap between the parts to be welded and to insure a definite spacing of the parts by means which will prevent the diminution of the gap during the preheating and which will also compensate for the actual contraction of the molten metal in the weld, when the latter cools.

After cutting away the metal on one or both of the faces of the parts to be welded to form the gap, one or more small blocks or spacers, preferably of the same material as the parts to be welded, is interposed between the ends of the parts within the gap, as illustrated in Fig. 1 of the drawings, in which 1 is a typical mold which encloses the ends of the parts 2, 2' which are to be welded, the ends of said parts having been cut away to form a gap 4 within the mold, in which gap the spacer blocks 3, which are materially less in cross sectional area than the contacting faces of the parts 2, 2', are placed. During the preheating operation, the ends of the pieces 2, 2' cannot expand toward each other, because of the interposed spacers 3 and thus reduce the gap, because of the resistance of the blocks, and, furthermore, the expansion of the blocks will force the pieces a little farther apart, thereby increasing the width of the original gap by an amount just sufficient to compensate for the contraction of the superheated molten metal upon cooling, so that the length of the finished welded sections 2, 2' will be the same as the original length of the conjoint sections before fracture. The size of the interposed spacing means 3 must be such that the said means will be completely melted by the superheated molten metal forming the weld, as otherwise the spacing means, if left intact within the weld, would impose undue stresses on the latter due to the inability of the weld to contract upon cooling. As these relatively small blocks are completely surrounded by the superheated molten metal, no difficulty will be experienced in making sure that they are completely melted.

Figure 2:
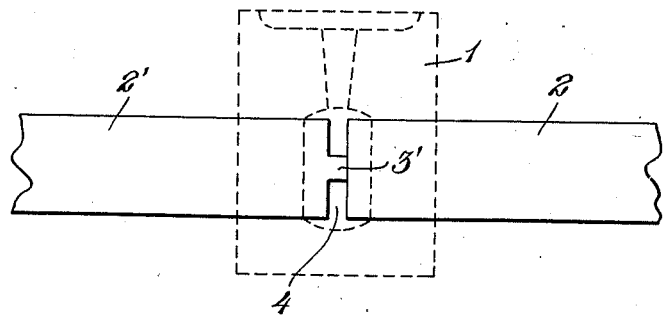
Fig. 2 is a similar view showing a spacer formed as an integral projection on one of the parts to be welded.

In case the parts or elements to be welded are not fractured sections of an original machine element, but are separate in themselves, their conjoint lengths are less than the overall length of the finished welded section, by the width of the gap 4, so that, when the spacing means is interposed, the gap cannot be reduced during the preheating operation and the expansion of the parts during the preheating and welding operations will be exactly compensated for by the contraction thereof, after the weld cools, and also the expansion of the spacing means will compensate for the subsequent contraction of the cast metal upon cooling. In most cases, particularly when fractured parts or elements are to be welded, it will be found advantageous in cutting away the face of one or both of the parts, to leave a projection on one of the faces, as indicated at 3' in Fig. 2, which projection constitutes the spacing means to maintain the gap during the preheating operation, and, in such case, the projection is of a relatively small cross sectional area as compared with the faces of the parts to be welded, so that the integral projection will be melted, when the superheated molten metal is tapped into the mold 1 to form the weld.

While the invention is especially adapted to the welding of parts together by the use of alumino-thermic steel, it is to be understood that it is likewise adapted to the use of superheated molten metal, capable of forming welded joints of the character indicated, when the superheat is applied to the molten metal by any other means, as, for example, in an electric furnace.

What I claim is:

1. The method of welding which comprises enclosing the portions of the parts to be welded in a mold, separating the adjacent faces of the parts by fusible spacing means of comparatively small cross sectional area and of a thickness to maintain the gap and to compensate for the shrinkage of the weld, and supplying the mold with superheated molten metal to effect the weld.

2. The method of welding which comprises enclosing the portions of the parts to be welded in a mold, separating the adjacent faces of the parts by a metallic spacer of comparatively small cross sectional area formed as an extension of one of the parts of a thickness to maintain the gap and to compensate for the shrinkage of the weld, and supplying the mold with superheated molten metal to effect the weld.

3. The method of welding broken parts which comprises cutting away a portion of the metal of the fracture to permit spacing of the parts to form a gap, enclosing the portions of the parts to be welded in spaced relation in a mold, separating the faces by a fusible metal spacer of relatively small cross sectional area and of a thickness to maintain the gap and compensate for the shrinkage of the weld, and supplying the mold with superheated molten metal to effect the weld.

4. The method of welding broken parts which comprises cutting away a portion of the metal at the fracture to form a gap and to leave a projection of relatively small cross sectional area on one face of the fracture of a thickness to bridge the gap and maintain the parts in spaced relation and to compensate for the shrinkage of the weld, and supplying the mold with superheated molten metal to effect the weld.

In testimony whereof I affix my signature.

HENRY DUNGAN KELLEY.